July 14, 1953  J. A. LAWLER  2,645,409
AIR INDUCTION SYSTEM HEATING IN SUPERCHARGED ENGINE
Filed May 17, 1948  2 Sheets-Sheet 1

FIG. I

INVENTOR.
JOHN A. LAWLER
BY
AGENT

INVENTOR.
JOHN A. LAWLER
BY
AGENT

UNITED STATES PATENT OFFICE 2,645,409

AIR INDUCTION SYSTEM HEATING IN SUPERCHARGED ENGINE

John Arthur Lawler, Seattle, Wash., assignor to Boeing Airplane Company, Seattle, Wash., a corporation of Delaware Application May 17, 1948, Serial No. 27,396

2 Claims. (Cl. 230—5)

This invention relates to aircraft engines, air induction systems, and particularly to means for preventing the accumulation of ice therein. It is particularly adaptable to air induction systems incorporating an exhaust-driven turbine which in turn drives a compressor supplying air to the aircraft engine and possibly another point of consumption such as the passenger compartment.

The manufacture of ice can result from a variety of conditions such as the ingestion of free moisture into the system thereby absorbing a great amount of heat, or by excessively lowering the temperature at the carburetor through evaporation of the fuel, or by ingestion of sleet or snow into the system. This accumulation of ice can be very dangerous as it can build up very rapidly to completely close the air intake passage and thus stop the engine.

A conventional source of heat to prevent this icing has been that heat available in the exhaust gas. However, the heat exchanger ordinarily used to transfer heat from the exhaust stack to the induction system has not been considered sufficiently dependable to be relied upon for a perfect seal. Since in some aircraft a portion of the compressor output is used to ventilate and pressurize the passenger compartment, contamination by the exhaust gases could cause asphyxiation. A further undesirable feature of this type of induction air heating is the space required and the excessive weight of the heat exchanger.

Another expedient to prevent icing in the induction system is to increase the compressor speed and reduce the opening at the throttle which raises the heat content of the air by the added heat of compression. This is not altogether satisfactory because the high pressure and low rate of flow in the compressor can cause a surging condition and result in very unstable operation.

It is therefore an object of this invention to effectively prevent icing conditions in the air induction system of a supercharged aircraft engine.

It is a further object of this invention to prevent icing conditions in the air induction system without introducing the possible hazard of contamination of this air by exhaust gases.

It is also an object of this invention to provide means for preventing icing conditions in the air induction system which means do not add much weight to the fixed equipment of the airplane.

Figure 1:
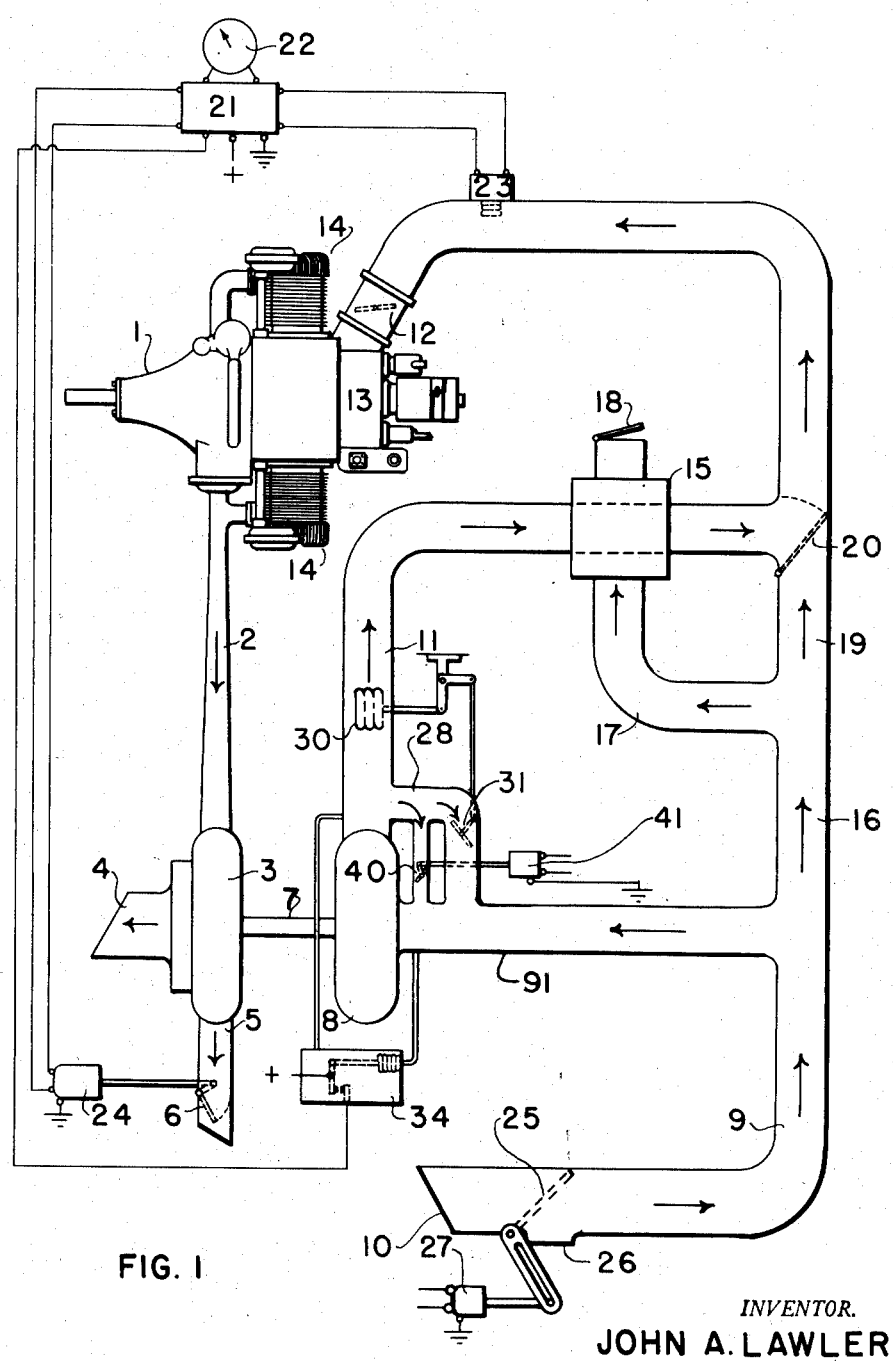
Figure 2:
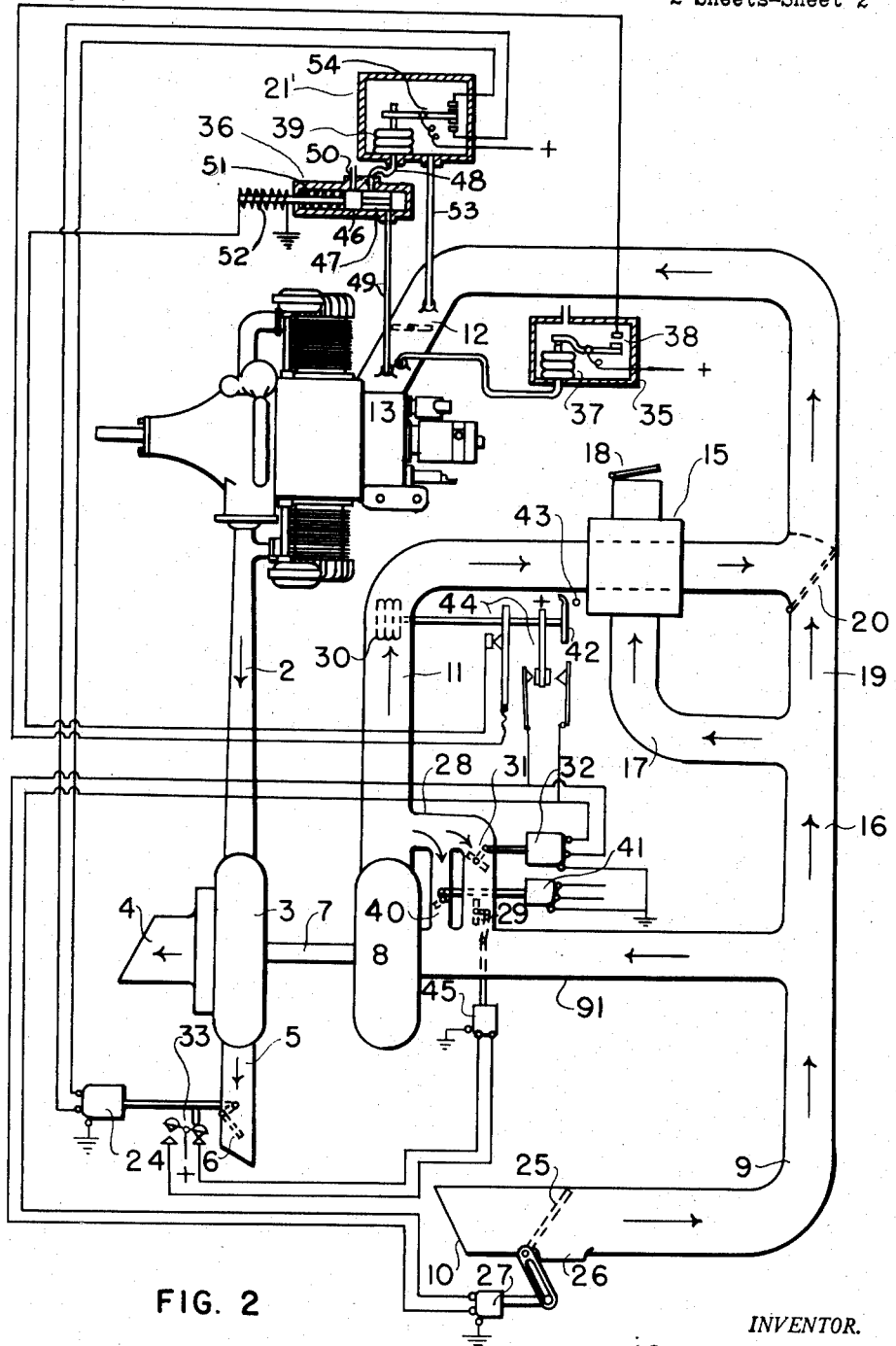

In the drawings, Figure 1 is a diagrammatic view of an aircraft engine and air induction system therefor which embodies the present invention and Figure 2 is a similar view of an air induction system having a modified control system therefor and which also embodies my invention. Similar numerals refer to similar parts in all figures.

Referring to the drawings, 1 is an aircraft engine the exhaust pipe 2 of which is connected to the intake side of a turbine 3. Also connected to the intake side of the turbine is a duct 5 containing a valve 6 termed the waste gate, which when open allows the exhaust gas to discharge into the atmosphere without passing through the turbine 3 and outlet 4. The speed of the turbine and energy available therefrom can thus be controlled by adjusting the position of the waste gate 6. Connected to the drive shaft 7 of the turbine is a centrifugal compressor 8, termed the supercharger. Atmospheric air is brought into the compressor through duct 9 using the pressure available from the speed of the airplane flying through the air. This is termed ram pressure and thus opening 10 of the intake duct 9 is termed ram inlet. The outlet of the compressor 8 is then led thru duct 11 to the throttle valve 12, into the carburetor 13, and into the engine cylinders 14.

Under some conditions it is desirable to remove a portion of the heat of compression in the air in duct 11 and therefore a heat exchanger 15 termed the intercooler is provided in the duct 11. Cool air is then bled from the ram intake 10 through duct 9, ducts 16 and 17, across the intercooler 15 and out past valve 18.

When maximum power is required for takeoff the waste gate is fully opened in order to reduce back pressure in the exhaust stack. Also, duct 19 is then used to by-pass the compressor thus nullifying the pressure drop therein. Since the pressure in duct 19 is higher than that in duct 11, when the compressor is not operating, valve 20 opens duct 19 to the throttle 12.

A suitable means for controlling the setting of the waste gate 6 in order to obtain a desired pressure upstream of the throttle 12 is shown schematically as a control box 21 in Figure 1. This adjustment is obtained by manually setting control knob 22. Since this control is conventional it is not a purpose of this discussion to go further into the workings of this control than to merely state that it measures the intake pressure by suitable pressure pickup 23 and in response to this value and the setting of knob 22 moves waste gate 6 with servomotor 24. The control 21 has been disclosed in Patent 2,388,350 to Daniel G. Taylor.

When the air surrounding the airplane contains an excessive amount of moisture or dust particles ram inlet 10 is closed by valve 25 and air is drawn in through sheltered air inlet 26. This valve 25 is operated at the discretion of the pilot by energizing motor 27 and is usually operated when icing conditions are anticipated.

The arrangement so far described is well known to those skilled in the art.

My invention concerns a means to heat the air in ducts 91 and 11 to prevent freezing the moisture therein.

It is well known that a pump or compressor increases the temperature of the fluid being pumped in addition to increasing its pressure. By passing some of the compressor output air through the compressor for a second time the temperature of this air is further increased. My invention concerns the addition of heat to the induction air by re-circulating a portion of this air through the compressor and particularly the control system necessary to effect this operation successfully.

A compressor re-circulation duct 28 allows some of the air from compressor outlet duct 11 to return to the compressor intake duct 91. Control of the rate of flow thru this re-circulation duct is effected primarily by valve 31. Adjustment of the setting of this valve can be accomplished with a suitable manual control or with a temperature responsive device termed a thermostat 30 in duct 11, shown diagrammatically as an enclosed bellows. It is not deemed necessary to describe this element in detail since many variations of temperature responsive control means suitable to this application are well known.

When maximum engine power is desired at high altitudes, maximum compressor output is necessary and the waste gate 6 is fully closed. As disclosed in Figure 2 I have therefore provided an additional valve 29 in the re-circulation duct. This valve is closed by motor 45 and switches 33 when the waste gate is fully closed.

With the engine and air induction system for which I have devised my recirculation heating system, atmospheric pressure at altitudes less than 6,000 feet, termed the main stage critical altitude, is high enough to satisfy engine air requirements without compressor operation. Below this critical altitude then, the compressor is needed only to supply cabin ventilation and supercharging requirements.

Since at altitudes below main stage critical altitude, the pressure control device 21 of Figure 1 would not call for sufficient supercharging of induction air to prevent icing by re-circulation, I have added a further control 34 which measures the pressure difference across the compressor 8 and if this difference is below the amount required to obtain de-icing heat by re-circulation, an electrical circuit is closed to cause control 21 to partly close the waste gate. It is to be understood that this is only a diagrammatic showing of control 34 as controls which will effect this operation are well known to those skilled in the art.

In Figure 2, I have shown a modification of my invention in which is used another conventional type of waste gate control 21'. This control adjusts the waste gate to such a position that there is always a certain minimum pressure drop across the throttle valve 12. This minimum pressure drop is a value which will allow the system to obtain the desired range of pressures in the carburetor 13.

In the specific equipment for which I have designed my re-circulation system this minimum pressure drop is a value of 3 inches of mercury. The pressure sensitive element 39 of control 21' then is so constructed that its resilience will require a pressure on its external surface greater than the pressure within by a difference equivalent to 3 inches of mercury to compress element 39 sufficiently to close switch 54 to its upper contact thereby energizing motor 24 to open wastegate 6 and increasing compressor output.

Since at altitudes below main stage critical altitude the control 21' would not call for sufficient supercharging of induction air to prevent icing by re-circulation I have added a control 35 responsive to the carburetor air intake pressure to sense this condition and a solenoid valve 36 operated by control 35 to call for additional supercharging at altitudes below main stage critical. These supplementary controls consist of a pressure sensitive element 37 which compares atmospheric pressure with the pressure downstream from the throttle 12. When the throttle pressure is lower than atmospheric, element 37 closes a switch 38 in an electrical circuit which energizes solenoid valve 36. Valve 36 then admits air at atmospheric pressure to the pressure sensitive element 39 in control 21', causing control 21' to call for increased compressor operation until a pressure of 3 inches of mercury above atmospheric pressure is obtained upstream of the throttle valve 12 or until carburetor air intake pressure exceeds atmospheric pressure to open switch 38.

Solenoid valve 36 consists of a spool-like valve element 46 having a centrally located annular space 47 which serves to allow communication of air to the interior of bellows 39 of control 21' through pipe 48 with either the carburetor air intake pressure through pipe 49 or with atmospheric pressure through port 50. A compression spring 51 serves to hold valve element 46 in position to connect the interior of bellows 39 with pipe 49 unless solenoid 52 is energized. In the latter event, valve element 46 closes off pipe 49 and allows air at atmospheric pressure to enter bellows 39 through port 50. The exterior surface of bellows 39 is subjected to induction air at the pressure of the upstream side of the throttle as admitted to the enclosure of control 21' through pipe 53.

In the operation of centrifugal compressors in engine air induction systems it has been found that when the output pressure is high in relation to rate of flow, pressure surges occur which will cause very unstable operation. Relief valves have therefore been installed in such systems to dump a portion of the compressor output overboard thereby lowering the output pressure. I have installed a relief valve 40 in my system but have returned the flow from this valve into the compressor intake and thus save the heat of compression for prevention of icing. This relief valve 40 is powered by a motor 41 and suitable manually operable controls which are not shown since devices of this nature are well known.

Referring to Figure 2, I have shown an electrical system so arranged as to permit the pilot or flight engineer to select automatic induction system re-circulation heating operation or operation without re-circulation heating. I have accomplished this by providing a control handle 42, catch 43, and electrical switch 44.

When operation without re-circulation heating is desired, handle 42 is pulled out and secured by catch 43. This opens contacts in switch 44 to prevent operation of control 35 and valve 36. Another series of contacts in switch 42 then causes motor 27 to move valve 25 to open ram inlet 19 and close sheltered inlet 26, and causes motor 32 to close re-circulation valve 31. The induction system will then operate as a conventional system.

However, when re-circulation heat is desired, the operator can release handle 42 from catch 43 and thus place switch 44 under the control of thermostat 36. Operation of valves 25, 31, and 36 will then be entirely automatic to add heat by recirculation when required.

I therefore claim as my invention:

1. In the air supply system of an aircraft engine having an air intake throttle valve and incorporating a turbo-supercharger and having a turbo-waste-gate control means responsive to throttle valve pressure drop, a return duct from the supercharger outlet to the supercharger inlet whereby air supplied by the supercharger can be heated by recirculation through the supercharger, a control valve in the return duct, means operatively connected to the control valve for adjustment thereof, a sheltered air inlet in the supercharger inlet duct, a ram air inlet in the supercharger inlet duct, a valve means to open either the sheltered inlet or the ram inlet to the supercharger inlet duct and a valve positioning means operatively connected to the ram inlet and sheltered inlet valve and the return duct control so that when the return duct is open, the supercharger inlet is open only to the sheltered inlet, and a pressure sensitive device connected to the throttle valve outlet and the atmosphere, said device being operatively connected to the waste gate control to modify its action so as to maintain the pressure upstream of the throttle valve above a predetermined minimum by operating the supercharger and thus obtaining recirculation heat when required.

2. In the air supply system of an aircraft engine having an air intake throttle valve and incorporating a turbo-supercharger and having a turbo-waste-gate control means responsive to the difference in pressure across the throttle valve, a return duct from the supercharger outlet to the supercharger inlet whereby air supplied by the supercharger can be heated by recirculation through the supercharger, a control valve in the return duct, thermostat means responsive to temperature in the air supply system which when operatively connected to the control valve adjusts the position thereof, a sheltered inlet in the supercharger inlet duct, a ram air inlet in the supercharger inlet duct, a valve means to open either the sheltered inlet or the ram inlet to the supercharger inlet duct, a valve positioning means operatively connected to the sheltered inlet and the ram inlet valve and to said thermostat, a pressure sensitive device connected to the throttle valve outlet and the atmosphere so that when said device is operatively connected to the waste gate control the pressure upstream of the throttle valve is maintained above a predetermined minimum greater than atmospheric pressure by operating the supercharger and thus obtaining recirculation heat when required, and a manually operable control means operatively connected to the return duct valve thermostat, the sheltered and ram inlet positioning means, and the throttle pressure control so that when in the off position the return duct valve is closed, the sheltered inlet is closed, the ram inlet is open, and the turbo-waste-gate control acts only in response to the difference in pressure across the throttle and when in the on position the return duct valve and the ram and sheltered inlet valve positioning means are under control of the thermostat, the sheltered inlet is open, the ram inlet is closed, and the turbo-waste-gate control acts in response to a difference in atmospheric pressure and the pressure upstream of the throttle as well as in response to pressure drop across the throttle.

JOHN ARTHUR LAWLER.

References Cited in the file of this patent

UNITED STATES PATENTS

| Number | Name | Date |
| --- | --- | --- |
| 1,222,352 | Banner | Apr. 10, 1917 |
| 1,984,013 | Fast | Dec. 11, 1934 |
| 2,317,723 | Becht | Apr. 27, 1943 |
| 2,342,219 | Price | Feb. 22, 1944 |
| 2,356,370 | Allen | Aug. 22, 1944 |
| 2,356,379 | Caris et al. | Aug. 22, 1944 |
| 2,368,642 | Crago | Feb. 6, 1945 |
| 2,409,533 | Borden | Oct. 15, 1946 |
| 2,462,097 | Heinz | Feb. 22, 1949 |
| 2,464,047 | Larkin | Mar. 8, 1949 |